United States Patent Office 3,055,766
Patented Sept. 25, 1962

3,055,766
AIR DRYING, FILM FORMING COMPOSITIONS
Heinz Fritz Reinhardt, Wilmington, Del., assignor to E. I. du Pont de Nemours and Company, Wilmington, Del., a corporation of Delaware
No Drawing. Filed Nov. 13, 1959, Ser. No. 852,630
13 Claims. (Cl. 106—287)

This invention relates to air-drying film-forming compositions and, more particularly, to such compositions containing as essential constituents an ethylenically unsaturated 1,3-dioxolane and a cobalt drier.

It has been found quite unexpectedly that compositions which contain a particular class of ethylenically unsaturated 1,3-dioxolane and a small effective proportion of a cobalt salt of the type commonly used as driers in air-drying paints, varnishes and enamels dry in air, i.e. when exposed to air or oxygen at normal painting temperatures, relatively thin deposits or coatings of such compositions undergo a change which converts the starting material into a dry continuous film or coating having the general appearance of a film or coating of a conventional air-drying film-forming composition based on, for example, a glyceride drying oil, an air-drying oleoresinous varnish or a drying oil modified alkyd resin.

The unsaturated dioxanes that are required in this invention have the structural formula

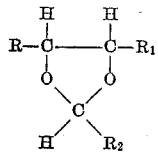

in which

R is a radical of the class consiting of vinyl and isopropenyl, $R_1$ is a radical of the class consisting of hydrogen, vinyl, propenyl, isopropenyl, beta-phenylvinyl, beta-(2-furyl)-vinyl, phenyl, 2-furyl and bicycloheptadienyl, and $R_2$ is a radical of the class consisting of saturated $C_1$–$C_9$ alkyl, vinyl, propenyl, isopropenyl, beta-phenylvinyl, beta-(2-furyl)vinyl, phenyl, tetrahydrophenyl, bicycloheptadienyl, 2-furyl, dihydropyranyl, and dichloroethyl, at least one of $R_1$ and $R_2$ being a radical of the class consisting of vinyl and isopropenyl.

Examples of such unsaturated dioxolanes are 2,4,5-trivinyl-1.3 - dioxolane; 2,4,5-triisopropenyl - 1,3-dioxolane; 4,5-divinyl - 2-phenyl-1,3 - dioxolane and 4-isopropenyl-2-vinyl-1,3-dioxolane. Still other species appear in the working examples of this specification.

The nomenclature for these compounds is based on the two ring oxygen atoms being in the 1 and 3 positions, with the ring carbon atoms being in the 2, 4 and 5 positions.

One method of preparing such compounds involves condensing an appropriate aldehyde with an appropriate diol, preferably under the influence of heat in the presence of an acidic catalyst, followed by neutralization and/or removal of the catalyst and finally purification, as by fractionation. For instance, 2,4,5-trivinyl-1,3-dioxolane can be made by reacting an excess, e.g. 2–4 mols, of acrolein with 1 mol of divinyl glycol (i.e. 1,5-hexadiene-3,4-diol) at 20°–35° C. for 1–3 hours in the presence of about 0.03 equivalent of hydrochloric acid catalyst, followed by neutralization of the catalyst with sodium acetate for example, and completed by fractional distillation under vacuum. As another example, 4-isopropenyl-5-vinyl-2-butyl-1,3-dioxolane can be made by an analogous process from 1-vinyl-2-isopropenyl ethylene glycol, as the diol, and valeraldehyde as the aldehyde.

The cobalt driers which are required in this invention are those that are commonly used in the paint, varnish and enamel art, i.e. the soaps, salts, and the like that are soluble, in sufficient proportion to be effective in promoting rapid air-drying, either directly in the unsaturated dioxolane or in at least one of the organic solvents that are common in the coating art and may for a desirable purpose be used in certain compositions of this invention. Examples of such cobalt soaps, salts and the like are the octoate, oleate, linoleate, naphthenate, resinate, and cobalt salts of partial esters of dicarboxylic acids (e.g. $C_1$–$C_{18}$ alkyl acid phthalate, malonate, succinate, adipate or sebacate). Mixtures of such cobalt compounds can be used, as well as mixtures of such cobalt compounds with similar compounds of other drier metals such as lead, manganese, zinc, copper, iron and nickel.

Ordinarily the amount of cobalt drier used is equivalent to 0.0005%–3% of cobalt based on the weight of the unsaturated dioxolane. When drying is to occur at normal room or atmospheric temperature, the amount of cobalt used is preferably about 0.01%–1.0%. When force-drying or baking is employed to shorten the drying period, the amount used is preferably 0.0005%–0.01%.

The preferred new compositions of this invention employ liquid dioxolanes because these lend themselves to the easy preparation of solvent-free liquid end products, a type especially desirable because the cost and fire hazard of volatile organic solvents are eliminated. However, dioxolanes which are more viscous than is desirable for a particular end use can be used in the form of a solution in a common solvent.

Suitable volatile organic solvents include aliphatic and aromatic liquid hydrocarbons, esters, ethers, ketones, alcohols and mixtures thereof.

The new compositions can be used as clear, unpigmented coating compositions, with solvent if required for convenience of application, or they can be pigmented, using proportions well known in the art, with pigments commonly used in the coating art, such as metal oxides, sulfides, sulfates, silicates, chromates, iron blues, organic colors, and metal flake pigments. As is the case with other air-drying materials, some pigments retard drying. Normally these are to be avoided in coating compositions formulated to dry at ordinary temperatures, but the retarding effect can be minimized by force-drying or incorporating suitable additives.

The unsaturated dioxolanes can provide the whole organic film-forming component of the new compositions, or they can be blended with other well known film-formers such as vegetable oils, oil-modified alkyd resins, oleoresinous varnishes, alkylated urea aldehyde resins, alkylated melamine aldehyde resins, polyepoxypolyhydroxy resins, acetylated phenol aldehyde resins, cellulose nitrate, cellulose acetate, cellulose acetate butyrate, polymers and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents.

The clear unpigmented compositions of this invention can be made by simply mixing the ingredients. When pigmentation is involved, a conventional pigment grinding or dispersing step is required.

The new compositions of this invention are useful for protecting and/or decorating articles made of such materials as wood, metal, ceramic, leather and fabric. The new compositions can be applied by any convenient method such as brushing, spraying, dipping, flowing and rollercoating followed by normal air-drying via simple exposure to air at ordinary room or atmospheric temperature or by force-drying at a cnvenient temperature above ambient temperature but below a temperature at which decomposition or other objectionable results occur.

The following examples illustrate the principles and practice of this invention, but they are not intended to limit the scope thereof. Unless otherwise specified, the parts and percentages are given by weight.

EXAMPLE 1

|  | Parts by wt. |
|---|---|
| 2,4,5-trivinyl-1,3-dioxolane | 100.00 |
| Cobalt butyl phthalate (10.9% cobalt) | 0.46 |

An air-drying film-forming composition of this invention is prepared by mixing the two components specified above in the proportions indicated until the cobalt salt is completely dissolved in the dioxolane. Cobalt, calculated as metal, is present in the proportion of about 0.05% by weight of the dioxolane.

A thin coating is prepared by drawing a small sample of this composition under a doctor blade (2.4 mil clearance) on a clean glass surface and exposing the wet coating to air at room temperature. In approximately three hours the coating is dry and hardened enough to handle without damage. It is clear and adheres well to the substrate. Similar coatings are prepared on wood and metal by the same technique. The resulting coatings are found to be durable when exposed outdoors. In the case of the wood and metal articles, the coatings protect the substrates from deterioration due to the weather.

EXAMPLE 2

A pigmented analogue of the composition of Example 1, which analogue illustrates the aforementioned pigmented products of this invention, is prepared simply by grinding 60 parts by weight of titanium dioxide pigment in 100 parts of the dioxolane and 100 parts of toluene until a smooth, uniform dispersion is obtained. The cobalt salt (0.46 part) is dissolved in this composition by mixing. The resulting white product can be sprayed to give coatings which air dry in about three hours and which are hard, tough and weather-resistant.

Other pigments, as set forth above, can be substituted for all or part of the titanium dioxide in this product. Many of the colored pigments can be used in considerably lower proportions and still yield adequate hiding power at normal coating thicknesses.

Additional examples of compositions of this invention appear in the following table where weight proportions of the essential components are tabulated. Also tabulated is the time (in hours) required for an unpigmented composition to air-dry to the tack-free stage and the time (in hours) for which certain of the coatings are force-dried as a substitute for prolonged exposure to air at room temperature. The 150° C. baking or force-drying temperature is merely a convenient one. Lower temperatures can be used with correspondingly longer times and vice versa. Also pigmentation can be accomplished if desired, as in Example 2. All of the compositions are applied by a conventional method, e.g. brushing, flowing, roller coating, spraying or dipping, and all of the resulting dried coatings have properties generally similar to the products of the foregoing examples.

*Table I*

| Ex. | Dioxolane (Recorded as prefix to the term-1,3-dioxolane) | Cobalt Salt | Percent Cobalt Based on Dioxolane | Hrs. at Room Temp. to Dry | Minutes at 150° C. |
|---|---|---|---|---|---|
| 3 | 4-Isopropenyl-5-vinyl-2-butyl | Octoate | 0.07 | 10 | 30 |
| 4 | 4-Vinyl-2-isopropenyl | Butyl phthalate | 0.7 | 3 | |
| 5 | 4,5-Diisopropenyl-2-beta phenylvinyl | Naphthenate | 1.0 | 14 | 30 |
| 6 | 4-Vinyl-5-isopropenyl-2-(alpha, beta dichloroethyl) | do | 1.0 | 14 | 30 |
| 7 | 4-Isopropenyl-5-phenyl-2-vinyl | Octoate | 0.8 | 15 | 30 |
| 8 | 4-Vinyl-5-propenyl-2-isopropenyl | Butyl phthalate | 0.07 | 4 | 30 |
| 9 | 4-Isopropenyl-5-beta (2'-furyl)vinyl-2-vinyl | do | 0.5 | 9 | 15 |
| 10 | 4,5-Divinyl-2-propenyl | Naphthenate | 0.09 | 4 | |
| 11 | 4-Isopropenyl-5-vinyl-2-beta (2'-furyl)vinyl | Butyl phthalate | 0.05 | 12 | 15 |
| 12 | 4-Vinyl-5-beta phenylvinyl-2-isopropenyl | Octoate | 0.1 | 14 | 30 |
| 13 | 4-Isopropenyl-5-vinyl-2-tetrahydrophenyl | do | 0.1 | 12 | 30 |
| 14 | 4,5-Divinyl-2-phenyl | Butyl phthalate | 0.3 | 15 | 30 |
| 15 | 4-Isopropenyl-5-(2'-furyl)-2-vinyl | do | 0.3 | 9 | 15 |
| 16 | 4-Vinyl-5-bicycloheptadienyl-2-isopropenyl | Linoleate | 0.1 | 10 | 30 |
| 17 | 4-Isopropenyl-5-vinyl-2-tetrahydrophenyl | Octoate | 0.2 | 10 | 30 |
| 18 | 4,5-Diisopropenyl-2-dihydropyranyl | Butyl phthalate | 0.2 | 10 | 30 |
| 19 | 4-Isopropenyl-5-vinyl-2-(2'-furyl) | do | 0.09 | 10 | 15 |
| 20 | 4,5-Divinyl-2-methyl | do | 0.3 | 9 | |
| 21 | 4,5-Divinyl-2-bicyclopentadienyl | do | 0.3 | 14 | 30 |
| 22 | 4,5-Divinyl-2-nonyl | do | 0.3 | 10 | |
| 23 | 2,4,5 Triisopropenyl | do | 0.7 | 6 | 15 |

It is apparent that many widely different embodiments of this invention can be made without departing from the spirit and scope thereof and, therefore, it is not intended to be limited except as indicated in the appended claims.

I claim.

1. An air-drying film-forming composition consisting essentially of (a) an unsaturated dioxolane having the structural formula

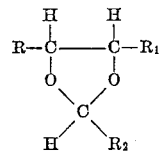

in which

R is a radical of the class consisting of vinyl and isopropenyl, $R_1$ is a radical of the class consisting of hydrogen, vinyl, propenyl, isopropenyl, beta-phenylvinyl, beta-(2-furyl)-vinyl, phenyl, 2-furyl and bicycloheptadienyl, and $R_2$ is a radical of the class consisting of unsaturated $C_1$–$C^9$ alkyl, vinyl, propenyl, isopropenyl, beta-phenylvinyl, beta-(2-furyl)vinyl, phenyl, tetrahydrophenyl, bicycloheptadienyl, 2-furyl, dihydropyranyl and dichloroethyl, at least one of $R_1$ and $R_2$ being a radical of the class consisting of vinyl and isopropenyl, and (b) a soluble cobalt drier in a proportion equivalent to 0.0005%–3% of cobalt based on said dioxolane.

2. A composition of claim 1 in which said dioxolane is 2,4,5-trivinyl-1,3-dioxolane.

3. A composition of claim 1 in which said dioxolane is 4-vinyl-2-isopropenyl-1,3-dioxolane.

4. A composition of claim 1 in which said dioxolane is 4,5-divinyl-2-propenyl-1,3-dioxolane.

5. A composition of claim 1 in which said dioxolane is 4-vinyl-5-propenyl-2-isopropenyl-1,3-dioxolane.

6. A composition of claim 1 in which said dioxolane is 2,4,5-triisopropenyl-1,3-dioxolane.

7. A composition of claim 1 in which said dioxolane is 4-isopropenyl-5-(2′-furyl)-2-vinyl-1,3-dioxolane.

8. A composition of claim 1 in which said dioxolane is 4-isopropenyl - 5 - beta(2′ - furyl)vinyl - 2 - vinyl-1,3-dioxolane.

9. A composition of claim 1 in which said dioxolane is 4,5-divinyl-2-methyl-1,3-dioxolane.

10. A composition of claim 1 in which said cobalt drier is present in a proportion equivalent to 0.01%–1% of cobalt based on said dioxolane.

11. A composition of claim 1 in which said cobalt drier is a member of the class consisting of cobalt octoate, oleate, linoleate, naphthenate, resinate and cobalt salts of partial esters of dicarboxylic acids.

12. A composition of claim 1 further containing pigment.

13. A composition of claim 1 further containing solvent for said dioxolane.

References Cited in the file of this patent

UNITED STATES PATENTS

| | | |
|---|---|---|
| 2,578,861 | Thomas | Dec. 18, 1951 |
| 2,856,309 | Gleason et al. | Oct. 14, 1958 |
| 2,862,007 | Stansbury et al. | Nov. 25, 1958 |

FOREIGN PATENTS

| | | |
|---|---|---|
| 515,737 | Canada | Aug. 16, 1955 |

OTHER REFERENCES

Morgan: Paint Manufacture, July 1951, XXI, 7, pages 239–259.

UNITED STATES PATENT OFFICE

CERTIFICATE OF CORRECTION

Patent No. 3,055,766 September 25, 1962

Heinz Fritz Reinhardt

It is hereby certified that error appears in the above numbered patent requiring correction and that the said Letters Patent should read as corrected below.

Column 1, line 36, for "consiting" read -- consisting --; line 49, for "-1.3-" read -- -1,3- --; column 3, line 7, for "cnvenient" read -- convenient --; column 4, line 65, for "unsaturated" read -- saturated --; line 66, for "$C_1$-$C^9$" read -- $C_1$-$C_9$ --.

Signed and sealed this 19th day of February 1963.

(SEAL)
Attest:

ESTON G. JOHNSON
Attesting Officer

DAVID L. LADD
Commissioner of Patents